A. B. BEYNON.
DEMOUNTABLE RIM.
APPLICATION FILED MAR. 1, 1917.
1,382,887.
Patented June 28, 1921.
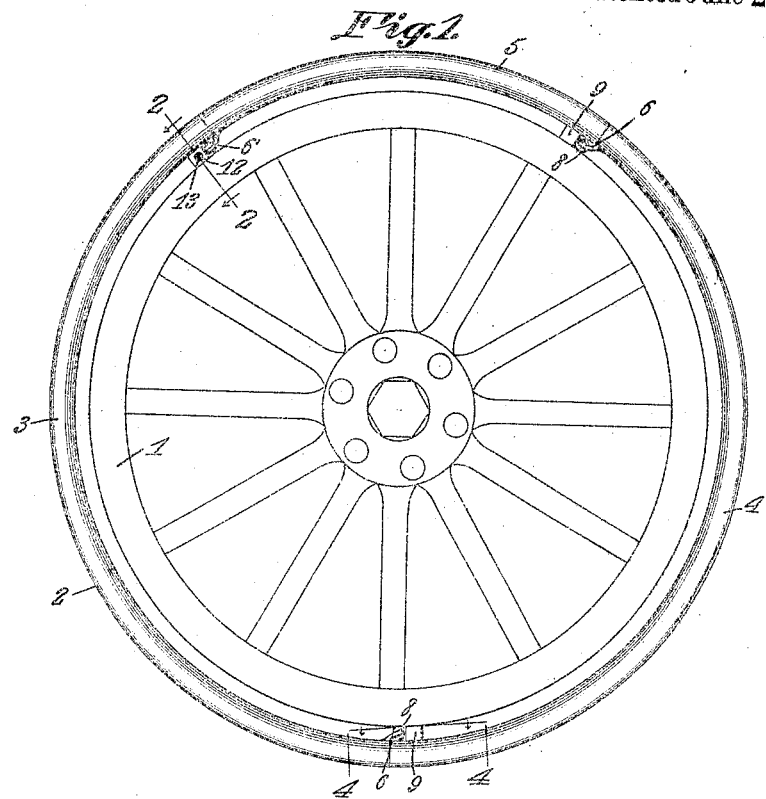
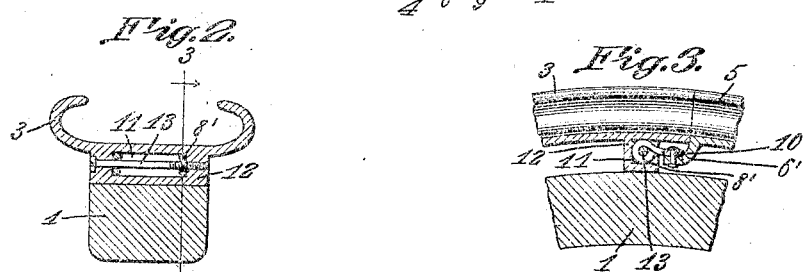
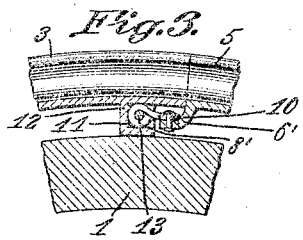
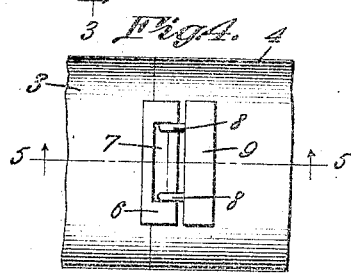
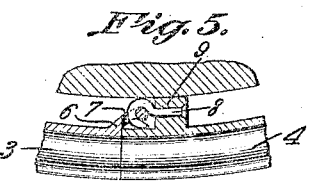
Arthur B. Beynon, INVENTOR
WITNESSES
John M. Dobie
L. B. Middleton
BY Richard B. Owen
ATTORNEY

UNITED STATES PATENT OFFICE.

ARTHUR B. BEYNON, OF SAN ANTONIO, TEXAS.

DEMOUNTABLE RIM.

1,382,887.  Specification of Letters Patent.  Patented June 28, 1921.

Application filed March 1, 1917. Serial No. 151,821.

*To all whom it may concern:*

Be it known that I, ARTHUR B. BEYNON, a citizen of the United States, residing at San Antonio, in the county of Bexar and State of Texas, have invented certain new and useful Improvements in Demountable Rims, of which the following is a specification.

This invention relates to a demountable rim for automobile wheels, and the principal object of the invention is to facilitate the attachment of the tire to the rim and the rim to the wheel.

Another object of the invention is to form a rim of segments and to provide means for securing the different segments together, after being arranged on the wheel.

Another object is to provide means to facilitate the locking and unlocking of the last segment to be put in place.

Another object of the invention is to provide a device of this character which is simple and durable in construction, reliable and efficient in operation, and one which can be manufactured and placed upon the market at a minimum cost.

To accomplish the above and various other objects, my invention consists essentially of a rim formed in segments with means for connecting the segments together.

The invention also consists in certain other features of construction and in the combination and arrangement of the several parts, to be hereinafter fully described and specifically pointed out in the appended claim.

In describing my invention in detail, reference will be had to the accompanying drawings, wherein like characters denote like or corresponding parts throughout the several views, and in which:

Figure 1 is a view of the invention applied to a wheel.

Fig. 2 is a section on the line 2—2 of Fig. 1.

Fig. 3 is a section on the line 3—3 of Fig. 2.

Fig. 4 is a section on the line 4—4 of Fig. 1.

Fig. 5 is a section on the line 5—5 of Fig. 4.

In these drawings, 1 indicates the wheel to which my improved rim 2 is applied. This rim is formed of three segments, 3, 4 and 5. On the under side of these segments, I secure the means for fastening the segments together.

As shown in Figs. 4 and 5, the fastening means for securing the segment 4 to the segments 3 and 5 consist of an extension or projection 6 formed on one segment and having a slot 7 therein, with which engage hooks 8 formed on a block like projection 9 secured to or formed on the other segment. As is shown, the projection 6 is located on the extreme end of the segment with the slot 7 therein extending beyond the end, while the block 9 is located a short distance from the end of its segment, so that when the hooks 8 engage the slot the ends of the two segments are in contact.

The fastening means for the segments 3 and 5 are slightly different from these just described. As shown in Fig. 3, the projection 6' has the loops 8' corresponding to the hooks 8 pivoted thereon by means of the pin 10, and these loops 8' enter a socket 11 formed by a box-like projection 12 on the segment 3. A screw bolt 13 passes through this box like projection 12 and through the loops 8' to hold said loops in the recess. Thus, it will be seen that by taking out the screw bolt 13 the loops 8' are free to leave the box like projection, so that the segment 5 can be parted from the other segments and thus the rim taken off the wheel and off the tire.

As is shown, the projections 9 and 12 form supports for holding the rim on the wheel.

In putting the rim with the tire therein on the wheel, the segment 5 is put on last. By pressing on this segment with the foot it may be forced into place, thus stretching the tire.

The more pressure the inflated casing and tube have against the rim, the tighter it is held in place.

It is thought from the foregoing that the advantages and novel features of my invention will be readily apparent.

I desire it to be understood that I may make slight changes in the construction and in the combination and arrangement of the several parts, provided such changes fall within the scope of the appended claim.

I claim as my invention:

A demountable rim comprising a plurality of segments, fastening means for connecting a pair of segments, said fastening means comprising a recessed block secured to one segment, loops pivotally connected to the coacting segment and adapted to be received in said recessed block, and a removable member extending through said recessed blocks and said loops for connecting the two segments.

In testimony whereof I affix my signature in presence of two witnesses.

ARTHUR B. BEYNON.

Witnesses:
D. A. LAMM,
G. V. CAMPBELL.